United States Patent

Nagasawa et al.

[15] 3,688,160

[45] Aug. 29, 1972

[54] THIN FILM NON-RECTIFYING NEGATIVE RESISTANCE DEVICE

[72] Inventors: Masahiro Nagasawa; Hiroyuki Watanabe, both of Hirakata, Japan

[73] Assignee: Matsushita Electric Industrial Co., Ltd., Kadoma, Osaka, Japan

[22] Filed: March 25, 1971

[21] Appl. No.: 128,099

[52] U.S. Cl. ....................317/238, 317/230, 317/258

[51] Int. Cl. ..............................................H01g 3/00

[58] Field of Search.......317/238, 230, 233, 234, 231

[56] References Cited

UNITED STATES PATENTS

| | | | |
|---|---|---|---|
| 3,056,073 | 9/1962 | Mead | 317/234 T |
| 3,139,754 | 7/1964 | Dare | 317/234 T |
| 3,336,514 | 8/1967 | Hiatt et al. | 317/234 T |
| 3,447,045 | 5/1969 | Hickmatt | 317/234 T |
| 3,483,110 | 12/1969 | Roygonaji | 317/234 X |

*Primary Examiner*—James D. Kallam
*Attorney*—Wenderoth, Lind & Ponack

[57] ABSTRACT

A non-rectifying negative resistance device. The device has a glass layer less than 100 microns in thickness with a composition consisting essentially of, by analysis, tellurium, vanadium, and oxygen. Electrodes are applied to opposite surfaces of said glass layer. The glass layer is electrically activated by applying thereto an electric field of more than $5\times10^4$ volt/cm through said electrodes. Such a device has a non-rectifying current-voltage characteristic which includes negative resistance regions, and it responds very rapidly to an applied electrical signal.

8 Claims, 1 Drawing Figure

Figure 1:
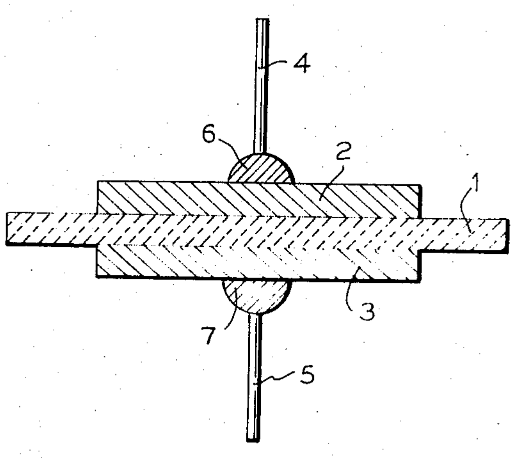

INVENTORS
MASAHIRO NAGASAWA
HIROYUKI WATANABE

BY Wenderoth, Lind & Ponack
ATTORNEYS

THIN FILM NON-RECTIFYING NEGATIVE RESISTANCE DEVICE

This invention relates to electrical devices comprising glassy materials, and in particular, to non-rectifying current-controlled negative resistance devices comprising oxide glasses, and also to a method for making the same.

Negative resistance devices of the prior art are ordinarily constructed primarily of crystalline semiconductors, most notably silicon and germanium. Most of them have rectifying current-voltage characteristics and are not always suitable for controlling an A.C. load circuit. Since crystalline semiconductors are generally sensitive to the presence of slight amounts of impurities, the manufacturing process for devices utilizing these materials is very complicated. It would be desirable to be able to make stable negative resistance devices utilizing glassy materials which are, in general, insensitive to the presence of impurities.

It is known in the art that certain glassy solid state semiconductive materials exist in at least two physical states: a semiconductive state, characterized by relatively high electrical resistance; and, a metallic state, characterized by relatively low electrical resistance. The electrical characteristic of this sort of semiconductive glass is expressed by two discrete curves on a current-voltage plot which correspond to the semiconductive state and the metallic state of the material, respectively. Devices utilizing these semiconductive glasses as the active elements are generally characterized as being "bistable." Contrary to such devices which utilize crystalline semiconductor materials, such devices are characterized by the absence of rectification. In other words, their electrical characteristics are symmetrical with respect to the polarity of applied electric fields. Such devices are, therefore, particularly suitable for use in controlling A.C. electrical load circuits, although they are also readily adaptable for controlling D.C. electrical load circuits.

Materials for such bistable devices are disclosed in U.S. Pat. Nos. 3,241,009, 3,271,591 and 3,177,013. These devices generally undergo rapid transitions between their two physical states when the electrical control signal (voltage or current) applied to the device reaches a critical value. These devices are suitable for use in switching and memory elements. Among these materials, several are known to have a negative resistance effect when they are in the semiconductive state, but these materials are not always suitable for use in negative resistance devices such as oscillators and amplifiers, because they are apt to change from the semiconductive state to the metallic state.

The electronic industry has long had a need for non-rectifying monostable negative resistance devices which include glassy materials. By the term "-monostable" is meant a device having an I–V characteristic which is single-valued with respect to either the current or the voltage. In other words, its electrical property can be completely expressed by a single continuous curve on a current-voltage plot. Such devices are suitable for use as negative resistance devices such as oscillators and amplifiers, not only for D.C, but also for A.C. circuits.

Most of the semiconductive glasses which are known to be useful for active devices such as mentioned above belong to the category of so-called "chalcogenide glass." Since chalogenide glasses and their raw materials are, in general, highly poisonous and are rather unstable in an oxidizing atmosphere, especially at high temperature, the manufacturing process for devices utilizing these materials is very complicated. Because of this problem, it would be highly desirable to be able to make stable devices utilizing oxide glasses.

It is well-known in the art that electrical devices which are called "glass thermistors" constructed of certain semiconductive oxide glasses show negative resistance effects when sufficient electric power is supplied thereto. The negative resistance effect of a glass thermistor is due to self-heating of the semiconductive glass followed by thermal runaway, and, in general, has a relatively long response time with respect to an applied electrical signal. The response time referred to herein is defined as the time required for the current through the device to reach 90 percent of the equilibrium value after the application of an electrical field. It has been generally difficult to use a glass thermistor as a negative resistance element in an electrical circuit for a high frequency current of more than 60 cycles.

An object of the present invention is to provide a non-rectifying negative resistance device which is characterized by a monostable current-voltage characteristic.

Another object of the present invention is to provide a non-rectifying high-speed negative resistance device including an oxide glass layer.

Another object is to provide a method for making a non-rectifying negative resistance device which is characterized by a monostable current-voltage characteristic.

These objects are achieved by providing a non-rectifying negative resistance device which comprises a glass layer having a thickness of not more than 100 microns and having a composition consisting essentially of, by analysis, tellurium, vanadium, and oxygen, and the glass layer having two electrodes, one applied to each of the opposite surfaces of said glass layer. The glass layer is electrically activated by applying an electric field of more than $5\times10^4$ volt/cm through said electrodes. Such a device has a non-rectifying current-voltage characteristic which includes negative resistance regions, and it responds very rapidly to an applied electrical signal.

A method for making a non-rectifying negative resistance device according to the present invention comprises, in combination, the steps of forming a glass layer, which has a thickness of not more than 100 microns and which has a composition consisting essentially of, by analysis, tellurium, vanadium, and oxygen, applying two electrodes, one to each of the opposite surfaces of said glass layer, and applying an electric field of more than $5\times10^4$ volt/cm through said electrodes.

Figure 2:
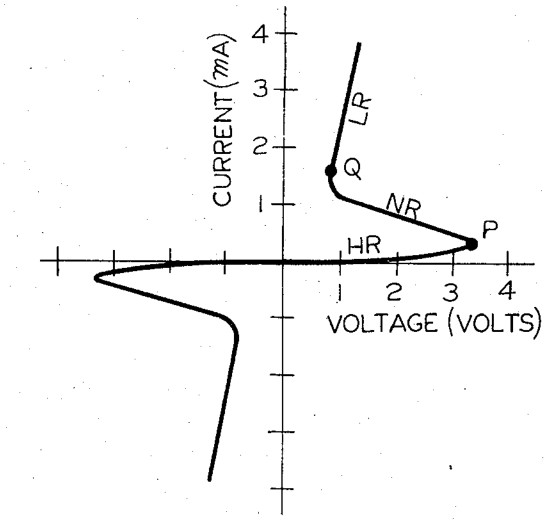

Other and further objects of this invention will be apparent from the following detailed description taken together with the accompanying drawings, wherein:

FIG. 1 is a cross-sectional view of a negative resistance device according to the invention; and FIG. 2 is a plot of current vs. voltage showing the electrical behavior of a device according to the invention.

Before proceeding with the detailed description of this invention, the construction of a non-rectifying negative resistance device contemplated by this invention will be described with reference to FIG. 1. A thin glass layer 1 has two electrodes 2 and 3, one applied to each of the opposite surfaces thereof. Two electrical leads 4 and 5 are connected conductively to the respective electrodes 2 and 3 by any suitable and available method, for example, soldering or welding, or by an electrically conductive adhesive paste. In FIG. 1, the two electrical leads 4 and 5 are connected to the two electrodes 2 and 3, respectively, by solder 6 and 7. A spring lead made of a suitable metal, such as phosphorous bronze, can also be used in place of lead 4 or 5 so that solder 6 and 7 are unnecessary.

Said glass layer has a thickness ranging from 0.3 to 100 microns, and has a composition consisting essentially of, by analysis, tellurium, vanadium, and oxygen. The atomic ratio of tellurium to vanadium ranges from 60:40 to 29:71. The atomic ratio of tellurium and vanadium referred to herein will be defined as the ratio of the number of tellurium atoms to the number of vanadium atoms.

In general, the starting materials employed to produce the glass of this invention are high purity chemical reagents, tellurium dioxide and vanadium pentoxide. A mixture of tellurium dioxide and vanadium pentoxide in a given atomic ratio is placed into a high purity alumina crucible. The mixture in the crucible is melted in open air at an elevated temperature of from 750°–1,000° C to form glass. After being fired, the glass is cooled to room temperature. In some cases the molten glass is poured into cold water for cooling it rapidly.

The glass layer 1 of the device can be formed by any suitable and available method. For example, a piece of the glass block is heated in a crucible to melt; a small amount of the molten glass is attached to one end of a pipe made of refractory, such as alumina; and then the molten glass is blown up by supplying a suitable flowing gas, such as air, oxygen, or nitrogen from the other end of the pipe. A glass layer having rather uniform thickness in a range from 0.3 to 100 microns can be prepared by this method. The thickness of the glass layer can be controlled by regulating the temperature of the glass and/or the flow rate of the blowing gas. Another method for preparing the glass layer is to grind and polish a glass block into a glass plate.

Said electrodes 2 and 3 are applied to the glass layer 1 by any suitable and available method, such as vacuum deposition of a metal or painting of a conductive paste. In general, thicker electrodes result in better long life stability of the resultant device. It is preferable to use electrodes thicker than 0.5 micron.

Glasses containing tellurium and vanadium in which an atomic ratio of tellurium to vanadium is more than 60:40 have a tendency to transform from the semiconductive state to the metallic state, and vice-versa; that is, they tend to be bistable. These glasses are not suitable for use as negative resistance elements. Glasses containing tellurium and vanadium in which an atomic ratio of tellurium to vanadium is less than 29:71 have both monostable characteristics and negative resistance effects. However, the negative resistance effect of these glasses is rather small and they have a relatively long response time with respect to an applied electrical signal, and hence cannot be utilized for high speed electrical operation. Glasses having tellurium and vanadium in an atomic ratio ranging from 60:40 to 29:71 tellurium to vanadium can be used to make devices having both monostable characteristics and high speed negative resistance effects.

The thickness of the glass layer 1 in the device has a significant effect on the resultant properties. In general, devices with glass layers more than 100 microns thick have a tendency to transform to an insulating state, and, in addition, they undergo an electrical activation only with difficulty, as described in detail hereinafter. The lower limit of the operable thickness is not so significant as the upper limit, but, in general, devices with glass layers less than 0.3 micron thick have a tendency to exhibit bistable characteristics. The thickness of the glass layer also affects the response time of the resultant device. In general, devices with thinner layers have shorter response times. Devices with glass layers less than 35 microns thick have extremely short response times, typically $10^{-6}$ sec., and are usable in high frequency electrical circuits.

It is preferable that the two electrodes 2 and 3 consist of a material selected from the group consisting of titanium, iron, nickel, zirconium, molybdenum, aluminum, gold and carbon. The electrode should be chemically inactive with respect to the glasses of this invention and, if the electrode is of a material selected from the above group, this ensures that the resulting device will have the monostable characteristics. The effectiveness of the negative resistance of a device according to the invention is dependent on the materials used for the electrodes. By "effectiveness of negative resistance" is meant the relative broadness of the voltage range within which the device exhibits a negative resistance effect, and is described in detail hereinafter. Excellent effectiveness can be obtained when at least one of the two electrodes consists of aluminum or gold. Among various electrode materials, carbon forms the most stable electrode for long-life stability of the resultant devices. The reason for this is that carbon is very inactive with respect to the glasses of this invention.

In general, a device constructed by the method described above has very high electrical resistance and does not show negative resistance effect at the first application of electrical voltage. It has been discovered according to the invention that it is necessary to subject the glass layer to "electrical activation" similar to a process well-known as "forming" in transistor technology. The electrical activation process comprises applying an electrical field of more than $5\times10^4$ volt/cm, i.e. volts per cm. of thickness, preferably more than $2\times10^5$ volt/cm, to the glass layer of the device through the two electrodes. The electrical field for activation can be applied from either an A.C. or a D.C. voltage source. An electrical field in the form of a pulse is also useable.

An illustrative example of an electrical activation process is as follows. A voltage pulse having an amplitude of, for example, 300 volts and a width of, for example, $2\times10^{-4}$sec., is applied across a series connected device having a glass layer of, for example, 10 microns thick, and a load resistance of, for example, 100,000 ohms which restricts flow of excess current. The electrical resistance of the device according to the invention is materially reduced by electrical activation. When electrical voltage is applied to the activated device, the device exhibits negative resistance effects. Devices having glass layers thicker than 100 microns require an activation voltage of more then 500 volts, preferably more than 2,000 volts, which can cause technical difficulties.

The electrical characteristics of the devices according to the present invention are measured in the following way. A series connection of a device and a resistor of, for example, 200,000 ohms is supplied with an A.C. voltage from a 60 cycle A.C. voltage source. The current-voltage characteristic of the device can be observed directly on an oscilloscope.

A plot of the current-voltage characteristic of a device according to the invention is represented in FIG. 2. As is seen, the characteristic is non-rectifying and monostable and consists of three distinct regions separated by two critical points P and Q; a high resistance region HR characterized by positive and relatively large differential resistance; a negative resistance region NR characterized by an increase in the current with decreasing voltage; and a low resistance region LR characterized by positive and relatively small differential resistance. The ratio of the voltage $V_P$ at point P to the voltage $V_Q$ at point Q, $V_P/V_Q$, is a measure of the effectiveness of negative resistance effects. The ratio is dependent on the electrode materials used. Remarkably large values, in other words, especially effective negative resistance, can be obtained when at least one of two electrodes of the device consists of aluminum or gold.

The device according to the invention is very stable and has a short response time with respect to an applied electrical signal. It has many applications similar to those of negative resistance elements constructed of crystalline semiconductors which are well-known in the art. The device according to the present invention is especially suitable for use in controlling A.C. load circuits, since it has a current-voltage characteristic which is symmetrical with respect to the polarity of applied electric fields.

EXAMPLE 1

A glass consisting essentially of tellurium, vanadium and oxygen and having tellurium and vanadium in an atomic ratio of 43:57 tellurium to vanadium was prepared by melting a mixture of 17.1 g of $TeO_2$ and 12.9 g of $V_2O_5$ at 950° C in air for 2 hours, and air-quenching to room temperature. A glass film having a thickness of about 2 microns was prepared in the following way. A piece of the glass block from the crucible was heated at about 600° C in an alumina crucible to melt; a small amount of the molten glass was attached to one end of an alumina pipe having a 2 mm I.D., 3 mm O.D., and 150 mm length; and then the molten glass was blown up by supplying nitrogen gas from the other end of the pipe. A nickel plate having an area of 3×3 $mm^2$ and a thickness of 0.5 mm and having a flat clean surface was used as a substrate. A glass layer having an area of 1.5 × 1.5 $mm^2$ was cut from the glass film, and this glass layer was fastened to the clean surface of the nickel plate by using a graphite-dispersed conductive paste ("Aquadag," Acheson Colloids Co., Michigan, U.S.A.) to form the base electrode of the device. A counter electrode circular in shape and having a diameter of about 0.5 mm was applied to the surface of the glass layer opposite the surface with the nickel plate thereon by vacuum deposition of aluminum. A copper lead having a diameter of 0.3 mm was welded to an edge of the nickel plate. A spring lead made of phosphorous bronze was attached conductively to the counter electrode by spring action. The electrical activation of the device was performed by applying a voltage pulse having an amplitude of 85 volts and a width of $10^{-3}$ sec. across a series connection of the device and a load resistance of 50,000 ohms. The response time of the device was measured by applying a voltage pulse having an amplitude of 7.0 volts (two times $V_P$) across a series connection of the device and a load resistance of 2,500 ohms and observing on an oscilloscope the time required for the current through the device to reach 90 percent of the equilibrium value. The electrical characteristics, including the response time of the device, are shown in Table 1.

EXAMPLE 2

The glass of this example was the same as that of Example 1. A glass film having a thickness of about 35 microns was prepared by the same method as in Example 1. A device was constructed by the same method as in Example 1. A voltage pulse having an amplitude of 350 volts nd a width of $3\times10^{-3}$ sec. and a series resistor of 300,000 ohms were used for the activation of the device. A voltage pulse having an amplitude of 24 volts and a series resistor of 6,000 ohms were used for the time response measurement. The electrical characteristics of the device are shown in Table 1.

EXAMPLE 3

A glass similar to that of Example 1 having tellurium and vanadium in an atomic ratio of 29:71 tellurium to vanadium was prepared by melting a mixture of 12.5 g of $TeO_2$ and 17.5 g of $V_2O_5$ at 950° C in air for 1 hour, and air-quenching to room temperature. A glass film having a thickness of about 8 microns was prepared by the same method as in Example 1. A device was constructed by the same method as in Example 1. Sixty cycle A.C. voltage with peak voltage of 160 volts and a series resistor of 200,000 ohms were used for the activation of the device. The response time of the device was measured by using a voltage pulse of 10.6 volts and a series resistor of 4,000 ohms. The electrical characteristics of the device are shown in Table 1.

EXAMPLE 4

A glass similar to that of Example 1 having tellurium and vanadium in an atomic ratio of 60:40 Te to V was prepared by melting a mixture of 21.7 g of $TeO_2$ and 8.3 g of $V_2O_5$ at 950° C in air for 1 hour, and air-quenching to room temperature. A glass film having a thickness of about 1 micron was prepared by the same method as in Example 1. Sixty cycle A.C. voltage with peak voltage of 57 volts and a series resistor of 50,000 ohms were used for the activation of the device. The response time of the device was measured by using a voltage pulse of 5.0 volts and a series resistor of 2,000 ohms. The electrical characteristics of the device are shown in Table 1.

EXAMPLE 5

A device was constructed by the same method as in Example 1, but the glass layer of this example was about 0.3 micron in thickness. A voltage pulse having an amplitude of 40 volts and a width of $10^{-4}$ sec. and a series resistor of 50,000 ohms were used for the activation of the device. The response time of the device was measured by using a voltage pulse of 4.0 volts and a series resistor of 2,000 ohms. The electrical characteristics of the device are shown in Table 1.

Example 6

The glass of this example was the same as that of Example 1. A glass plate with an area of about 0.1 $cm^2$ and a thickness of about 100 microns was prepared by grinding down a piece of glass with an alumina abrasive powder. Two electrodes having diameters of about 0.5 mm were applied by vacuum deposition of aluminum to opposite surfaces of the glass plate. Two electrical leads were connected to the electrodes by using an adhesive paste having silver dispersed therein. The device as constructed was activated by using 60 cycle A.C. voltage with peak voltage of about 500 volts and a series resistor of 1,000,000 ohms. The response time of the device was measured by using a voltage pulse of 50 volts and a series resistor of 8,000 ohms. The electrical characteristics of the device are shown in Table 1.

TABLE 1

| | Glass Layer | | Electrical Characteristics | | | | | |
|---|---|---|---|---|---|---|---|---|
| ex. | composition (Te:V) | thickness (micron) | Vp (volt) | Ip (mA) | $V_Q$ (volt) | $I_Q$ (mA) | $\frac{Vp}{V_Q}$ | response time (sec) |
| 1 | 43:57 | 2 | 3.5 | 0.3 | 1.0 | 0.7 | 3.5 | $1.5\times10^{-8}$ |
| 2 | 43:57 | 35 | 12 | 0.4 | 4.0 | 1.1 | 3.0 | $2.5\times10^{-8}$ |
| 3 | 29:71 | 8 | 5.3 | 0.6 | 1.8 | 1.5 | 2.9 | $8.0\times10^{-7}$ |
| 4 | 60:40 | 1 | 2.5 | 0.1 | 0.7 | 0.3 | 3.6 | $1.1\times10^{-7}$ |
| 5 | 43:57 | 0.3 | 2.0 | 0.1 | 0.6 | 1.5 | 3.3 | $2.4\times10^{-7}$ |
| 6 | 43:57 | 100 | 25 | 0.5 | 12 | 0.3 | 2.1 | $1.8\times10^{-3}$ |

EXAMPLE 7

The glass film of this example was the same as that of Example 1 with respect to the composition and also the thickness. Seven glass layers similar to that in Example 1 were cut from the glass film. These glass layers were placed, respectively, on clean surfaces of plates of titanium, nickel, iron, zirconium, molybdenum, aluminum and gold having the same dimensions as the nickel plate used in Example 1. The glass layers were fastened to the respective metal plates by heating at 350° C for 1 hour in nitrogen gas atmosphere. A counter electrode and two electrical leads were applied to each of the glass layers by the same method as in Example 1. The devices were activated by the same method as in Example 1. The electrical characteristics of the devices are shown in Table 2.

TABLE 2

| | Electrical Characteristics | | | | |
|---|---|---|---|---|---|
| Electrode Material | Vp (volt) | Ip (mA) | $V_Q$ (volt) | $I_Q$ (mA) | $V_p/V_Q$ |
| titanium | 3.7 | 0.3 | 2.2 | 0.75 | 1.7 |
| nickel | 3.2 | 0.35 | 1.7 | 0.8 | 1.9 |
| iron | 4.1 | 0.25 | 3.0 | 0.9 | 1.4 |
| zirconium | 3.0 | 0.3 | 1.6 | 0.8 | 1.9 |
| molybdenum | 4.0 | 0.25 | 2.9 | 0.9 | 1.4 |
| aluminum | 3.6 | 0.3 | 1.0 | 0.7 | 3.6 |
| gold | 3.5 | 0.3 | 0.7 | 0.7 | 5.0 |

EXAMPLE 8

Three devices were constructed and activated by the same method as in Example 1, but the counter electrodes of the devices of this example were vacuum-deposited titanium, gold and carbon, respectively. Sixty cycle A.C. voltage with a peak voltage of 14 volts was applied across each device while it was series connected with a resistor of 6,000 ohms. The change in value of $V_P$ was measured for each device after 24, 100 and 500 hours of operation. The results are shown in Table 3 along with the electrical characteristics of the devices.

Table 3

| | Electrical Characteristics | | | | | Change in Vp, (%) | | |
|---|---|---|---|---|---|---|---|---|
| Electrode Material | Vp (volt) | Ip (mA) | $V_Q$ (volt) | $I_Q$ (mA) | $Vp/V_Q$ | 24 hr | 100 hr | 500 hr |
| titanium | 4.1 | 0.2 | 2.5 | 0.8 | 1.6 | +4.2 | +5.1 | +5.4 |
| gold | 3.0 | 0.3 | 0.6 | 0.7 | 5.0 | +1.0 | +1.4 | +2.0 |
| carbon | 3.5 | 0.25 | 2.0 | 0.85 | 1.8 | +0.3 | +0.4 | +0.4 |

While the invention has been described in detail in the foregoing specification, the aforesaid is by way of illustration only, and is not restrictive in character.

What is claimed is:

1. A non-rectifying negative resistance device comprising a glass layer having a thickness of not more than 100 microns and having a composition consisting essentially of, by analysis, tellurium, vanadium, and oxygen, and two electrodes, one applied to each of the opposite surfaces of said glass layer, said glass layer being the electrically activated product of an electric field of more than $5\times10^4$ volt/cm of thickness of the glass layer applied through said electrodes.

2. A negative resistance device as claimed in claim 1 wherein said glass layer is not more than 35 microns in thickness.

3. A negative resistance device as claimed in claim 1 wherein said glass layer is not less than 0.3 micron in thickness.

4. A negative resistance device as claimed in claim 1 wherein said tellurium and vanadium are present in atomic ratios ranging from 60:40 to 29:71 Te to V.

5. A negative resistance device as claimed in claim 1 wherein each of said electrodes consists essentially of one material selected from the group consisting of titanium, nickel, iron, zirconium, molybdenum, aluminum, gold, and carbon.

6. A negative resistance device as claimed in claim 1 wherein at least one of said two electrodes consists essentially of aluminum.

7. A negative resistance device as claimed in claim 1 wherein at least one of said two electrodes consists essentially of gold.

8. A negative resistance device as claimed in claim 1 wherein said two electrodes consist essentially of carbon.

* * * * *